Sept. 22, 1959  H. LEACH  2,905,283
JOINT FOR ADJACENT PANEL MEMBERS
Filed June 6, 1957
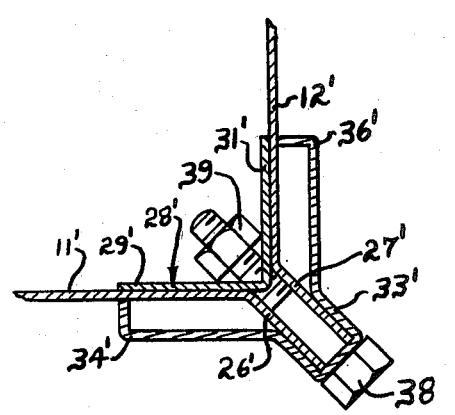
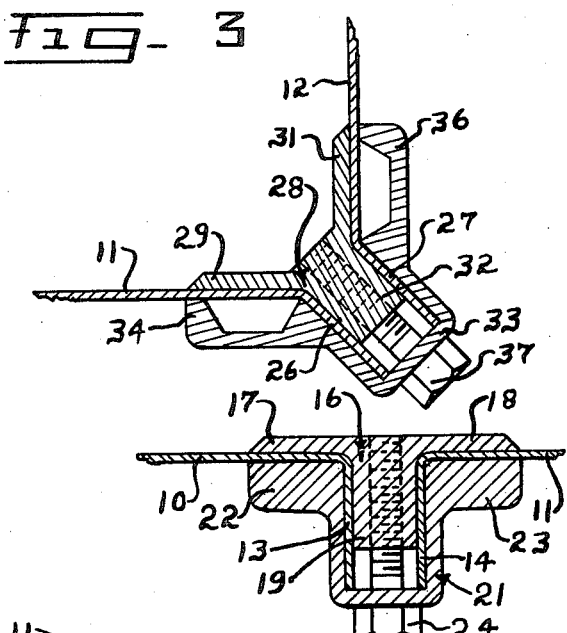
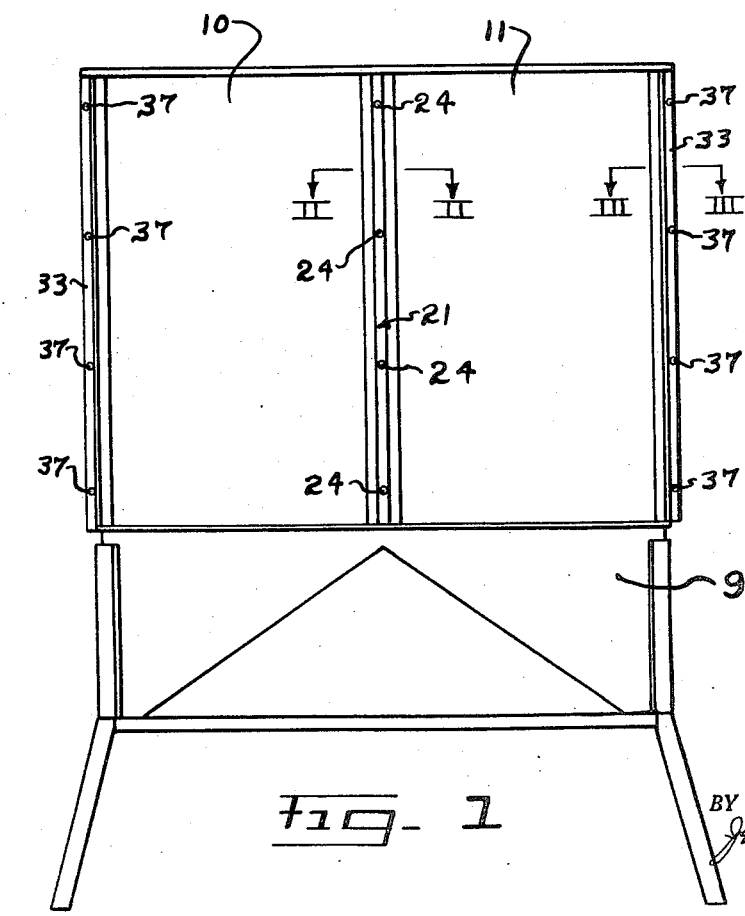
INVENTOR.
Holt Leach
BY Jennings, Carter & Thompson
Attorneys

United States Patent Office 2,905,283
Patented Sept. 22, 1959

2,905,283

JOINT FOR ADJACENT PANEL MEMBERS

Holt Leach, Gadsden, Ala.

Application June 6, 1957, Serial No. 664,116

1 Claim. (Cl. 189—36)

This invention relates to a joint between adjacent panel members in a building structure, and has for an object the provision of such a joint which may be readily assembled and disassembled with a minimum of labor and which shall be adapted to join adjacent panel members securely together.

In the construction of various structures having walls made from metal panels, as heretofore known to me, adjacent panels have been joined together by overlapping the edges with securing means such as rivets or bolts passing through the overlapped edges or by a welding seam between the edges of the panels. It is also the practice in some structures to provide adjacent edges of the panels with out-turned flanges and securing the adjacent flanges with bolts or rivets. With any of the methods heretofore known to me an undue amount of labor was required to erect such a structure and difficulties were encountered in making a tight joint.

These and other difficulties are overcome by means of my invention in which I provide adjacent edges of the panels with outturned flanges and provide inner and outer clamping members which bear against the inner and outer surfaces of the adjacent panels and over the outturned flanges and which are joined together by means of clamping bolts which pass between the outturned flanges. My improved joint may be employed with equal success where the surfaces of the adjacent panels are in alignment or where they are angularly disposed with respect to each other as in a corner joint.

Features of my invention are illustrated in the accompanying drawing forming a part of this application in which:

Fig. 1 is a view showing a sheet metal structure in which adjacent panels are joined together in accordance with my invention;

Fig. 2 is a sectional view taken along the line II—II of Fig. 1 showing a joint in which the surfaces of adjacent panels are in alignment;

Fig. 3 is a sectional view taken along the line III—III of Fig. 1 showing a joint in which the surfaces of the adjacent panels are angularly disposed with respect to each other; and, Fig. 4 is a sectional view similar to Fig. 3 showing a modified form of clamping means.

Referring to the drawing I show by way of illustration a structure embodying a base 9 and wall panels 10 and 11 with aligned surfaces and with panel 12 (and others not shown) disposed at an angle to the panel 11. The panels 10 and 11, as shown in Fig. 2 of the drawing, are provided with outturned flanges 13 and 14. Disposed on the inside of the structure is an inner clamping member 16 having side portions 17 and 18 which bear against the inner surfaces of the panels 10 and 11 and which is provided with a rib portion 19 fitting between the outturned flanges 13 and 14. On the outside of the structure, I provide an outer clamping member 21 which fits snugly over the outturned flanges 13 and 14 and is provided with side portions 22 and 23 which bear against the outer surfaces of the plates 10 and 11. In the example shown in Fig. 2 of the drawing, the rib portion 19 is bored and tapped at a plurality of points along its length to receive clamping bolts 24 which pass through suitable openings in the outer clamping member 21 and into the threaded holes in the rib portion 19. The clamping members 16 and 21, as shown in Fig. 1, extend the length of the joint and thus serve to draw the panels 10 and 11 tightly against the clamping members and thus form a continuous, unbroken, wall surface.

In Fig. 3 of the drawing I show the means for joining the wall panel 11 to the panel 12 which is disposed at an angle to the panel 11. As shown, the panels 11 and 12 are provided with outturned flanges 26 and 27 which are turned outwardly from the plane of their respective surfaces at a lesser angle than the flanges 13 and 14, shown in Fig. 2, where the flat surfaces of the panels 10 and 11 are in alignment. With the panels disposed as shown in Fig. 3 of the drawing, I provide an inner clamping member 28 having side portions 29 and 31 which bear against the inner surfaces of the plates 11 and 12, respectively. The inner clamping member 28 is also provided with a rib portion 32 which fits snugly between the outturned flanges 26 and 27. Fitting snugly over the outturned flanges 26 and 27 is an outer clamping member 33 having side portions 34 and 36 which bear against the outer surfaces of the plates 11 and 12, respectively. A plurality of bolts 37 pass through the outer clamping member 33 into bored and tapped holes, indicated in dotted lines, provided in the rib portion 32 of the clamping member 28. The clamping members 28 and 33 extend the length of the joint between the adjacent panel members 11 and 12 to form a continuous unbroken joint between the plate members.

In Fig. 4 of the drawing I show a modified form of my invention in which panel members 11′ and 12′ disposed angularly with respect to each other are provided with outturned flanges 26′ and 27′ similar to the structure shown in Fig. 3 of the drawing. An inner clamping member 28′, formed from sheet metal, has lateral portions 29′ and 31′ which bear against the inner surfaces of the panels 11′ and 12′ respectively. In accordance with this modification I also provide an outer clamping member 33′ formed from sheet metal and provided with side portions 34′ and 36′ which bear against the outer surfaces of the plates 11′ and 12′, respectively. As shown, the outer clamping member 33′ fits snugly over the outturned flanges 26′ and 27′ and is provided with holes to receive clamping bolts 38 which fit snugly between the outturned flanges 26′ and 27′ and which pass through holes provided in the inner clamping member 28′. Nuts 39 are provided on the inner ends of the bolts 38 which may be tightened up by turning the bolts 38 from the outside. As will be seen in Fig. 4 the nuts 39 bear against the inner sides of the inner clamping member 28′ and are thus prevented from turning when the bolts are tightened.

It is contemplated by my invention that the clamping members 16, 21, 28 and 33, may be formed by extruded metal and that the clamping members 28′ and 33′, shown in Fig. 4 of the drawing, will be formed from sheet metal. With either form of my invention it will be seen that I have provided means whereby adjacent sheets in a structure may be drawn tightly together and held in assembled relation to provide an unbroken, continuous joint. It will also be seen that such a structure may be readily assembled and disassembled with a minimum of labor. The joint is equally applicable to a flat surface as shown in Fig. 2 of the drawing or as a corner joint as shown in Figs. 3 and 4 of the drawing. My improved joint may also be employed to join horizontally disposed plates as well as vertically disposed plates together. A still further advantage in my improved joint resides in the fact that adjacent panels or plates do not have to line up perfectly with each other in order for them to be assembled as is the case where the adjacent panels are bolted or riveted together. The joint is simple in design, making it economical to produce and because of the strength and rigidity inherent in its design, it requires relatively few bolts to hold the adjacent edges of the joints together. Structures manufactured according to my invention may be prefabricated at the factory and shipped knocked down to be assembled at its destination, thus saving considerable shipping space.

While I have shown my invention in but two forms, it will be obvious to those skilled in the art that it is not so limited but is susceptible of various other changes and modifications without departing from the spirit thereof, and I desire, therefore, that only such limitations shall be placed thereupon as are specifically set forth in the appended claim.

What I claim is:

A continuous joint connecting the edges of a pair of adjacent flat sheet metal panels disposed in angular relation to each other comprising an outturned flange on the adjacent edge of each panel, said outturned flanges being spaced from and extending in parallel relation to each other and being of the same width, an inner clamping member comprising an angle having angularly disposed legs in face-to-face contact with the inner surface of the panels, the intersection of the legs of said angle being positioned between the outturned flanges with one leg in contact with one panel and the other leg in contact with the other panel, an integral outer clamping member having one portion spanning the extending edges of said outturned flanges, a second portion of said outer clamping member in contact with the outer surface of the outturned flanges immediately adjacent the extending edges thereof and holding the flanges in parallel relation to each other, a third portion on each side of the outer clamping member contacting the adjacent panels on the outer surfaces thereof adjacent the outturned flanges, said inner and outer clamping members having aligned openings therein positioned between the outturned flanges, and a threaded member extending through the aligned openings and between the flanges and having relatively movable clamping parts, one of said parts contacting the outer surface of said spanning portion of the outer clamping member and the other part thereof extending between and contacting the inner surface of the legs of the inner clamping member at a position spaced from the intersection of the legs and holding the legs in contact with the panels, whereby upon movement of said clamping parts toward each other the inner and outer clamping members grip the panels tightly.

References Cited in the file of this patent

UNITED STATES PATENTS

| 190,918 | Smith et al. | May 15, 1877 |
| 798,309 | Voltz | Aug. 29, 1905 |

FOREIGN PATENTS

| 405,787 | Great Britain | July 24, 1936 |
| 203,204 | Switzerland | Aug. 1, 1939 |